United States Patent
Shoemaker et al.

(10) Patent No.: US 10,655,491 B2
(45) Date of Patent: May 19, 2020

(54) TURBINE SHROUD RING FOR A GAS TURBINE ENGINE WITH RADIAL RETENTION FEATURES

(71) Applicants: Rolls-Royce Corporation, Indianapolis, IN (US); Rolls-Royce North American Technologies, Inc., Indianapolis, IN (US)

(72) Inventors: Brian J. Shoemaker, Indianapolis, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 762 days.

(21) Appl. No.: 15/438,853

(22) Filed: Feb. 22, 2017

(65) Prior Publication Data

US 2018/0238188 A1    Aug. 23, 2018

(51) Int. Cl.
*F01D 11/08*        (2006.01)
*F01D 25/00*        (2006.01)

(52) U.S. Cl.
CPC ............ *F01D 11/08* (2013.01); *F01D 25/005* (2013.01); *F05D 2220/323* (2013.01); *F05D 2240/11* (2013.01); *F05D 2260/38* (2013.01); *F05D 2260/83* (2013.01); *F05D 2300/6033* (2013.01)

(58) Field of Classification Search
CPC ........ F01D 25/24; F01D 25/246; F01D 25/26; F01D 11/08; F05D 2240/11; F05D 2260/83; F05D 2300/6033; F05D 2220/323; F05D 2260/38

See application file for complete search history.

(56) References Cited

U.S. PATENT DOCUMENTS

| 3,067,983 | A | * | 12/1962 | Koziura | F01D 9/042 |
| | | | | | 415/209.2 |
| 4,576,548 | A | * | 3/1986 | Smed | F01D 11/005 |
| | | | | | 277/359 |
| 4,796,423 | A | * | 1/1989 | Lievestro | F01D 9/04 |
| | | | | | 403/209 |
| 5,071,313 | A | * | 12/1991 | Nichols | F01D 11/08 |
| | | | | | 415/134 |
| 5,188,507 | A | * | 2/1993 | Sweeney | B23H 9/10 |
| | | | | | 415/170.1 |

(Continued)

FOREIGN PATENT DOCUMENTS

GB        1406098 A * 9/1975 .............. F01D 11/08

OTHER PUBLICATIONS

GE Aviation, Jefferies Investor Visit, dated May 12, 2014, 78 pg. (pg. 32).

*Primary Examiner* — David E Sosnowski
*Assistant Examiner* — Maranatha Boardman
(74) *Attorney, Agent, or Firm* — Barnes & Thornburg LLP

(57) ABSTRACT

A gas turbine engine assembly includes a turbine shroud having a carrier segment and adjacent blade track segments. The carrier segment is arranged around a central axis of the gas turbine engine and the blade track segments are supported by the carrier segment. The turbine shroud segment further includes a retainer that is configured to locate the blade track segments radially relative to the central axis of the gas turbine engine.

14 Claims, 4 Drawing Sheets

(56) References Cited

U.S. PATENT DOCUMENTS

| | | | | |
|---|---|---|---|---|
| 5,201,846 | A * | 4/1993 | Sweeney | F01D 9/04 415/170.1 |
| 5,358,262 | A | 10/1994 | Roberts | |
| 5,603,510 | A * | 2/1997 | Sanders | F01D 11/025 277/413 |
| 5,738,490 | A * | 4/1998 | Pizzi | F01D 11/005 415/139 |
| 6,062,813 | A * | 5/2000 | Halliwell | F01D 9/04 415/173.1 |
| 6,368,054 | B1 * | 4/2002 | Lucas | F01D 11/08 415/135 |
| 6,406,256 | B1 | 6/2002 | Marx | |
| 6,514,046 | B1 | 2/2003 | Morrison et al. | |
| 6,808,363 | B2 | 10/2004 | Darkins, Jr. et al. | |
| 6,935,836 | B2 * | 8/2005 | Ress, Jr. | F01D 11/025 415/173.2 |
| 7,090,459 | B2 | 8/2006 | Bhate et al. | |
| 7,189,057 | B2 | 3/2007 | Lee et al. | |
| 7,195,452 | B2 | 3/2007 | Allan et al. | |
| 7,258,942 | B2 | 8/2007 | Chou et al. | |
| 7,445,426 | B1 * | 11/2008 | Matheny | F01D 9/042 415/135 |
| 7,497,443 | B1 | 3/2009 | Steinetz et al. | |
| 7,824,152 | B2 * | 11/2010 | Morrison | F01D 9/042 415/135 |
| 8,132,442 | B2 | 3/2012 | Merrill et al. | |
| 8,152,455 | B2 * | 4/2012 | Wunderlich | F01D 11/08 415/173.1 |
| 8,206,098 | B2 | 6/2012 | Prill et al. | |
| 8,257,029 | B2 * | 9/2012 | Habarou | F01D 11/08 415/135 |
| 9,353,649 | B2 * | 5/2016 | Rioux | F01D 25/246 |
| 9,945,243 | B2 * | 4/2018 | O'Leary | F01D 11/12 |
| 2002/0192074 | A1 * | 12/2002 | Turnquist | F01D 11/122 415/173.3 |
| 2013/0156550 | A1 | 6/2013 | Franks et al. | |
| 2014/0250893 | A1 | 9/2014 | Chan et al. | |
| 2016/0258304 | A1 * | 9/2016 | Sippel | F01D 25/246 |
| 2016/0356497 | A1 * | 12/2016 | Freeman | F23R 3/002 |
| 2016/0356499 | A1 * | 12/2016 | Freeman | F23R 3/007 |

\* cited by examiner

TURBINE SHROUD RING FOR A GAS TURBINE ENGINE WITH RADIAL RETENTION FEATURES

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and ignited. Products of the combustion reaction in the combustor are directed into the turbine where work is extracted to drive the compressor and, sometimes, an output shaft, fan, or propeller. Left-over products of the combustion reaction are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. The blade tracks block gasses from passing over the blades without interaction with the blades.

Some blade tracks are formed by a number of blade track segments arranged circumferentially adjacent one another to form a hoop around the blades of the rotating wheel assemblies. An annular clearance gap may be formed between the tip of the blades and the blade track segments. A size of the clearance gap may be controlled to block gasses from passing between the blades and the blade track segments to increase the efficiency of the gas turbine engine.

SUMMARY

The present disclosure may comprise one or more of the following features and combinations thereof.

A turbine shroud segment adapted for use in a gas turbine engine may include a carrier segment, a blade track segment, and a first retainer. The carrier segment may comprise metallic materials. The carrier segment may include a body plate that extends partway around a central axis of the turbine shroud segment and a bracket that extends radially inward away from the body plate. The body plate may define a first pocket that extends radially outward into the body plate. The bracket may define an axially opening birdmouth located radially inward of the first pocket. The blade track segment may comprise ceramic matrix composite materials. The blade track segment may include a runner shaped to extend partway around the central axis to define a primary gas path and a hanger that extends radially outward from the runner and into the birdmouth of the carrier segment.

The first retainer may be located in the first pocket and may be configured to positively position the blade track segment radially inward toward the central axis. The first retainer may be sized to extend radially inward out of the first pocket into the birdmouth and into engagement with the blade track segment in order to apply a retention force to the hanger of the blade track segment in order to position the blade track segment so that a clearance distance between the runner and turbine blades located in the primary gas path can be measured while the turbine shroud segment is not in operation.

In some embodiments, the body plate may include a radial inner surface that faces the hanger and an aft side surface that extends radially away from the radial inner surface. The first pocket may extend axially through the aft side surface into the body plate.

In some embodiments, the first retainer may comprise a shim. The shim may extend axially through the aft side surface into the first pocket and may extend radially inward through the radial inner surface of the body plate toward the hanger.

In some embodiments, the turbine shroud segment may further comprise a plurality of load pads located radially between the hanger and the bracket to locate force loads acting on the hanger. The plurality of load pads may be spaced apart circumferentially from one another. The first retainer may be circumferentially aligned with one of the plurality of load pads.

In some embodiments, the body plate of the carrier segment may define a second pocket that extends radially outward into the body plate. The second pocket may be spaced apart circumferentially from the first pocket. The turbine shroud segment may further comprise a second retainer positioned in the second pocket.

In some embodiments, the first retainer may comprise a cylindrical wave spring. In some embodiments, the first retainer may comprise a leaf spring that extends circumferentially and includes undulations that extend radially inward and radially outward relative to the central axis.

According to another aspect of the present disclosure, a turbine shroud segment may include a carrier segment, a blade track, and a retainer. The carrier segment may include a body plate spaced apart from a central axis of the turbine shroud segment and a bracket that extends away from the body plate to define a birdmouth. The body plate may define a pocket that opens into the birdmouth. The blade track segment may include a runner shaped to extend partway around the central axis and an attachment portion that extends into the birdmouth to define a gap between the attachment portion and the body plate. The retainer may be positioned in the pocket. The retainer may be sized to extend radially inward out of the pocket to block the blade track segment from moving radially outward relative to the central axis.

In some embodiments, the turbine shroud segment may further include a plurality of load pads positioned radially between the attachment portion of the blade track segment and the bracket. In some embodiments, the turbine shroud segment may further include a load pad positioned radially between the attachment portion of the blade track segment and the bracket and the retainer may be circumferentially aligned with the load pad.

In some embodiments, the retainer may comprise a cylindrical wave spring. In some embodiments, the retainer may comprise a leaf spring that extends circumferentially and undulates radially inward and radially outward relative to the central axis.

In some embodiments, the body plate may be formed to define a pocket that opens into the birdmouth and that extends radially outward into the body plate. The retainer may be located in the pocket and may extend radially inward toward the attachment portion of the blade track segment.

In some embodiments, the body plate may include a radial inner surface that faces the attachment portion of the blade track segment and an aft side surface that extends radially away from the radial inner surface. The pocket may extend axially through the aft side surface into the body plate.

In some embodiments, the retainer may comprise a shim. The shim may extend axially through the aft side surface into the pocket and may extend radially inward through the radial inner surface of the body plate toward the attachment portion of the blade track segment.

According to another aspect of the present disclosure, a method of providing turbine shroud segment adapted for use with a gas turbine engine may include a number of steps. The method may include providing a carrier segment shaped to extend partway around a central axis of the turbine shroud segment, a blade track segment, and a retainer, the carrier segment including a body plate formed to include a pocket that extends radially outward into the body plate and a bracket that extends radially inward from the body plate to define an axially opening birdmouth between the body plate and the bracket, and the blade track segment including a runner that extends partway around the central axis and a hanger that extends radially outward from the runner, inserting the hanger of the blade track segment into the birdmouth of the carrier segment, and positioning the retainer in the pocket to block the blade track segment from moving radially outward toward the body plate relative to the central axis.

In some embodiments, the runner may have a radial inner surface that faces the central axis and a radial outer surface spaced apart from the radial inner surface. The method may further include determining a location of the radial inner surface relative to the central axis while the turbine shroud segment is not in use. In some embodiments, the method may further include positioning a plurality of load pads radially between the hanger of the blade track segment and the bracket of the carrier segment.

In some embodiments, the body plate may have a radial inner surface that faces the hanger. The hanger may have an outer hanger surface that faces the radial inner surface of the body plate. The method may include measuring a distance between the radial inner surface of the body plate and the outer hanger surface of the hanger to provide a clearance thickness measurement.

In some embodiments, the retainer may include a shim. The method may further include selecting the shim based on the clearance thickness measurement.

These and other features of the present disclosure will become more apparent from the following description of the illustrative embodiments.

DETAILED DESCRIPTION

Figure 1:
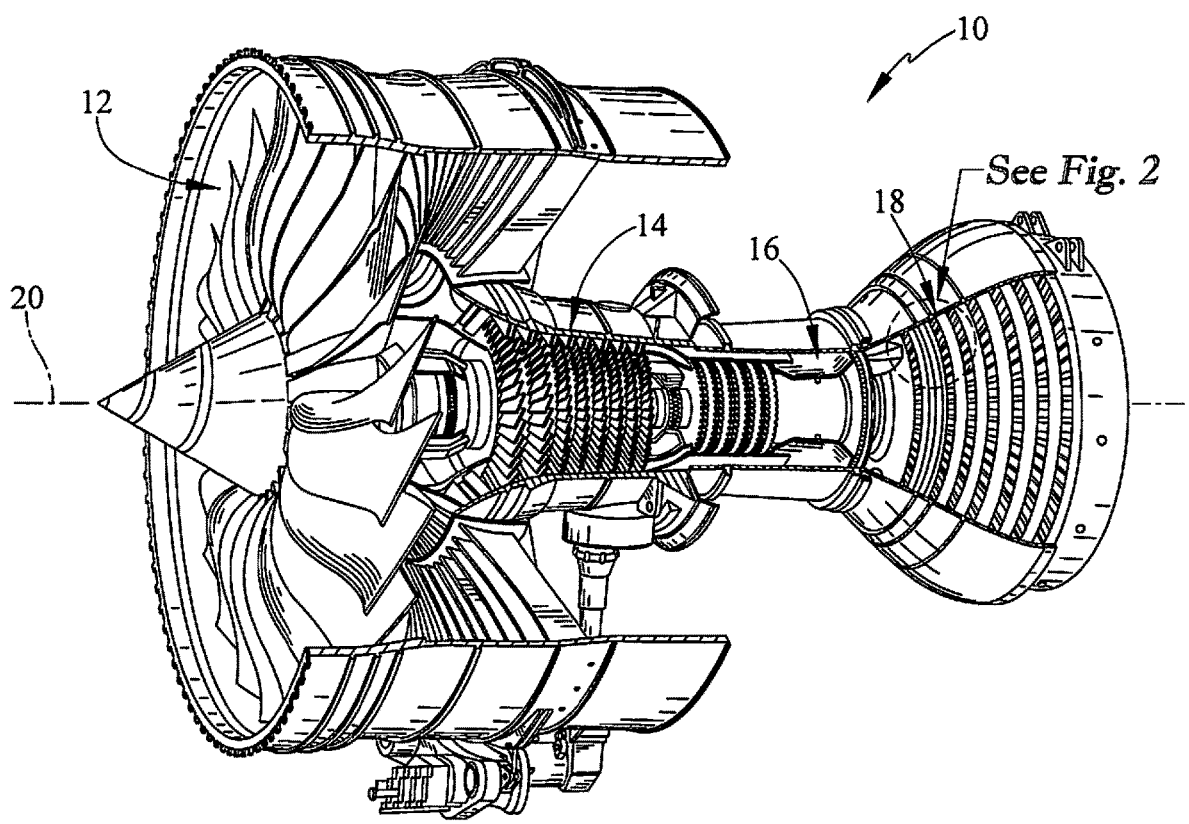
FIG. 1 is cutaway view of a gas turbine engine assembly including a fan, a compressor, a combustor, and a turbine showing that the turbine includes a rotating wheel assemblies in a turbine case.

For the purposes of promoting an understanding of the principles of the disclosure, reference will now be made to a number of illustrative embodiments shown in the drawings and specific language will be used to describe the same.

An illustrative gas turbine engine 10 includes a fan 12, a compressor 14, a combustor 16, and a turbine 18 as shown in FIG. 1. The turbine 18 is configured to power the gas turbine engine 10 and includes at least one turbine wheel assembly 22 having a plurality of turbine blades 23 and a turbine shroud segment 24 arranged around the turbine wheel assembly 22 as shown in FIGS. 1 and 2.

Figure 2:
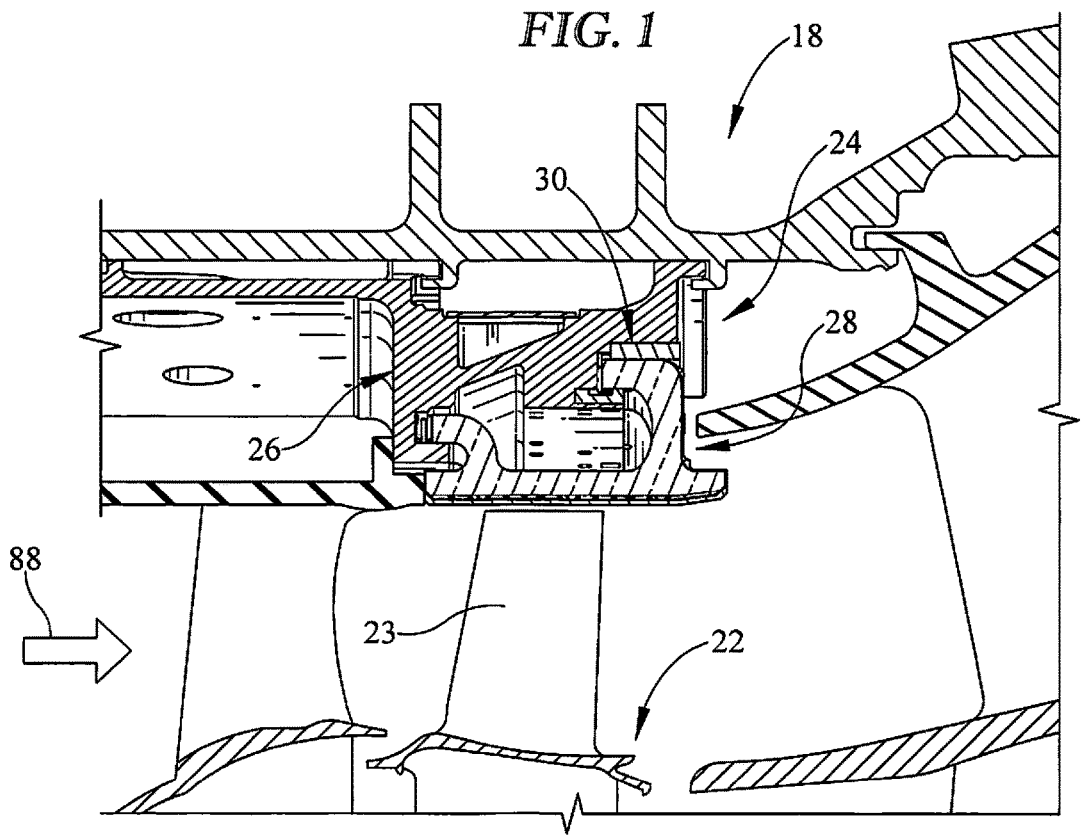
FIG. 2 is a cross sectional view of a portion of the turbine included in the gas turbine engine of FIG. 1 showing that the turbine includes a turbine shroud, and further showing that the turbine shroud includes a carrier segment, a blade track segment arranged around the rotating wheel assembly, and retainers located between the carrier segment and the blade track segment.
Figure 3:
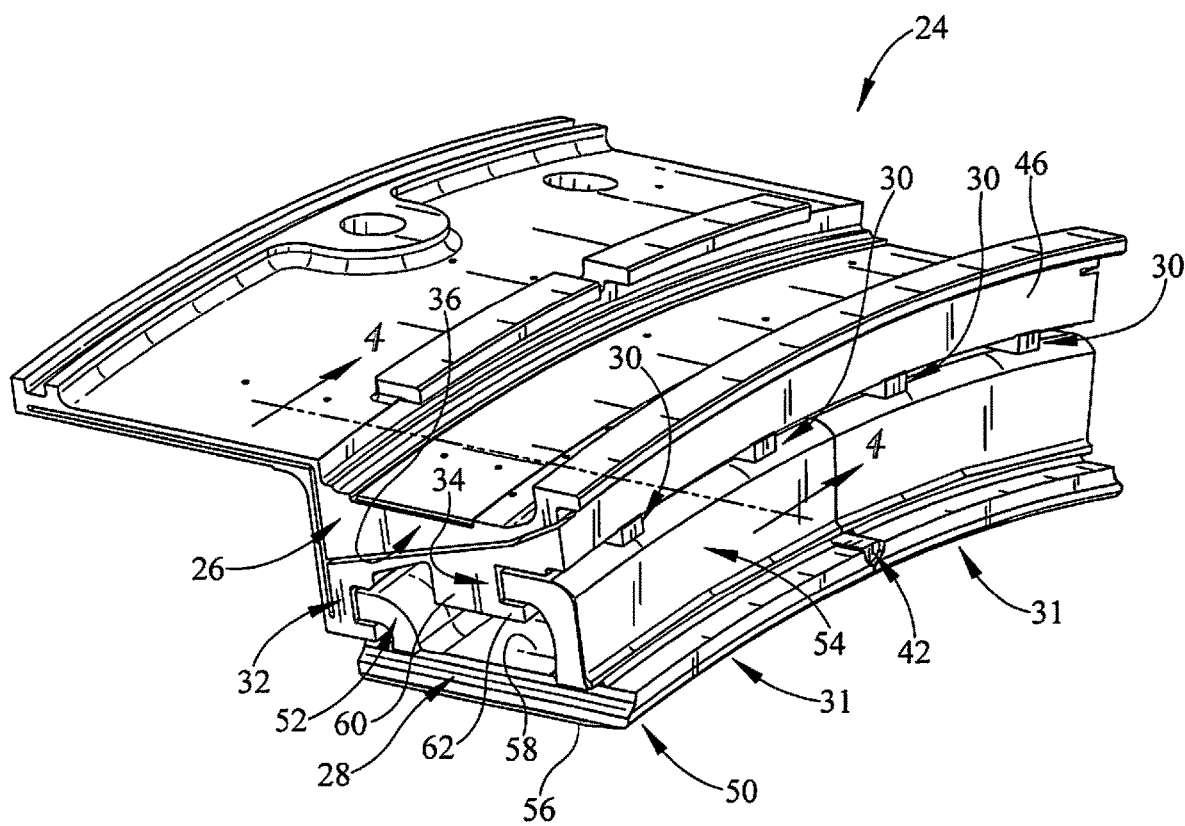
FIG. 3 is a perspective view of the turbine shroud of FIG. 2 showing that the carrier segment defines a birdmouth, an aft hanger of the blade track extends into the birdmouth, and the retainers are located in the birdmouth between the carrier segment and the aft hanger.

The turbine shroud segment 24 includes a carrier segment 26 a blade track 28 as shown in FIGS. 2 and 3. The carrier segment 26 is arranged around a central axis 20 of the turbine shroud segment 24 and is configured to support the blade track 28 in position adjacent the blades 23 of the turbine wheel assembly 22 as shown in FIG. 2. The blade track 28 blocks combustion products from passing over the blades 23 and insulates the carrier segment 26 from the hot combustion products.

In some turbine shroud segments, portions of the blade track may move radially inward toward the central axis during operation of the engine from an initial cold build location to a hot operation location due to gas pressures acting on the blade track during operation of the engine. It may be difficult to measure the hot operation location of the blade track for data collection and analysis as compared to the cold build location. However, the cold build location may not be fully representative of the hot operation location due to the movement of the blade track.

Figure 4:
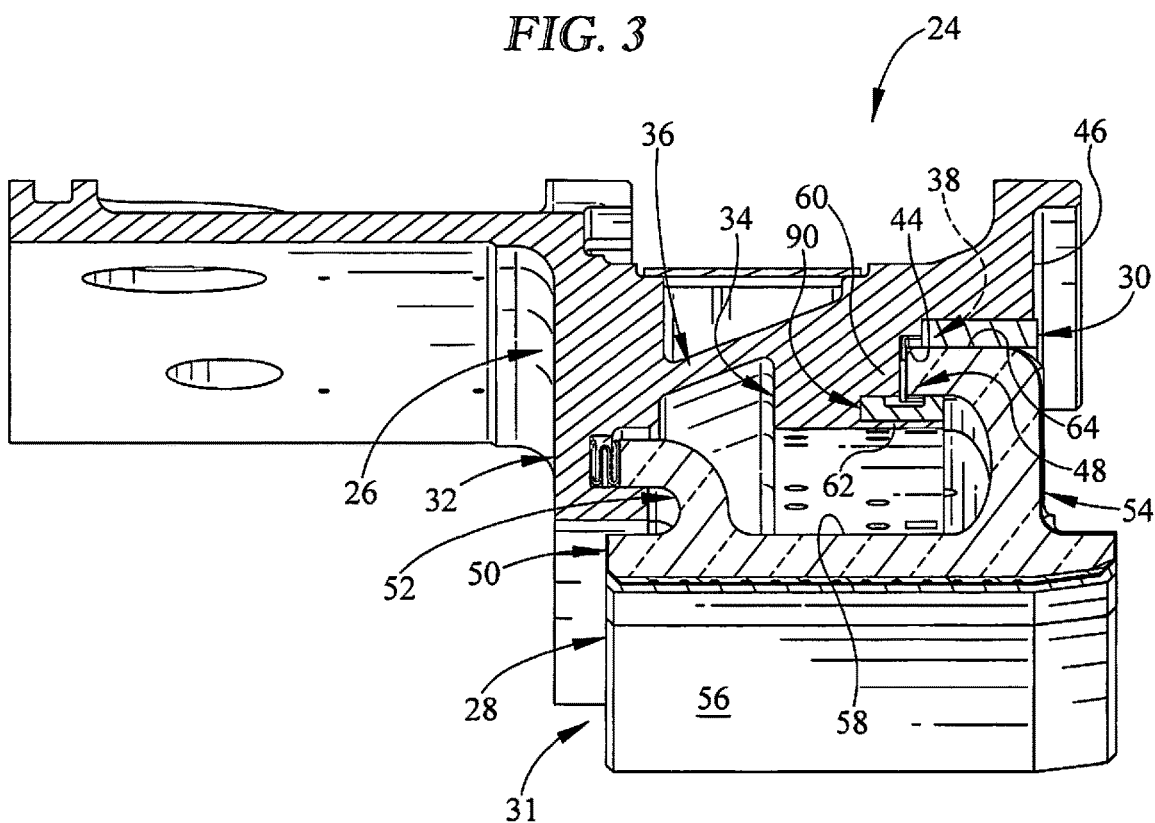
FIG. 4 is a detail cross sectional view of the turbine shroud of FIG. 3 showing that the carrier segment includes a body plate and a bracket that extends inward from the body plate and the retainers comprise shims located in pockets formed in the body plate.

The turbine shroud segment 24 of the illustrated embodiment includes retainers 30 located between the carrier segment 26 and the blade track 28 to position the blade track 28 radially inward toward the central axis 20 as suggested in FIGS. 3 and 4. As a result, the initial cold build location of the blade track 28 is more representative of the hot operation location of the blade track 28. Therefore, information relating to the radial location of the blade track 28 such as, for example, a tip clearance gap between the blade track 28 and the tips of the blades 23, may be collected while the engine is not in operation.

In some embodiments, the retainers 30 comprise shims 30 as shown in FIGS. 1-4. In some embodiments, the retainers 30 comprise cylindrical wave springs 230 as shown in FIGS.

Figure 7:
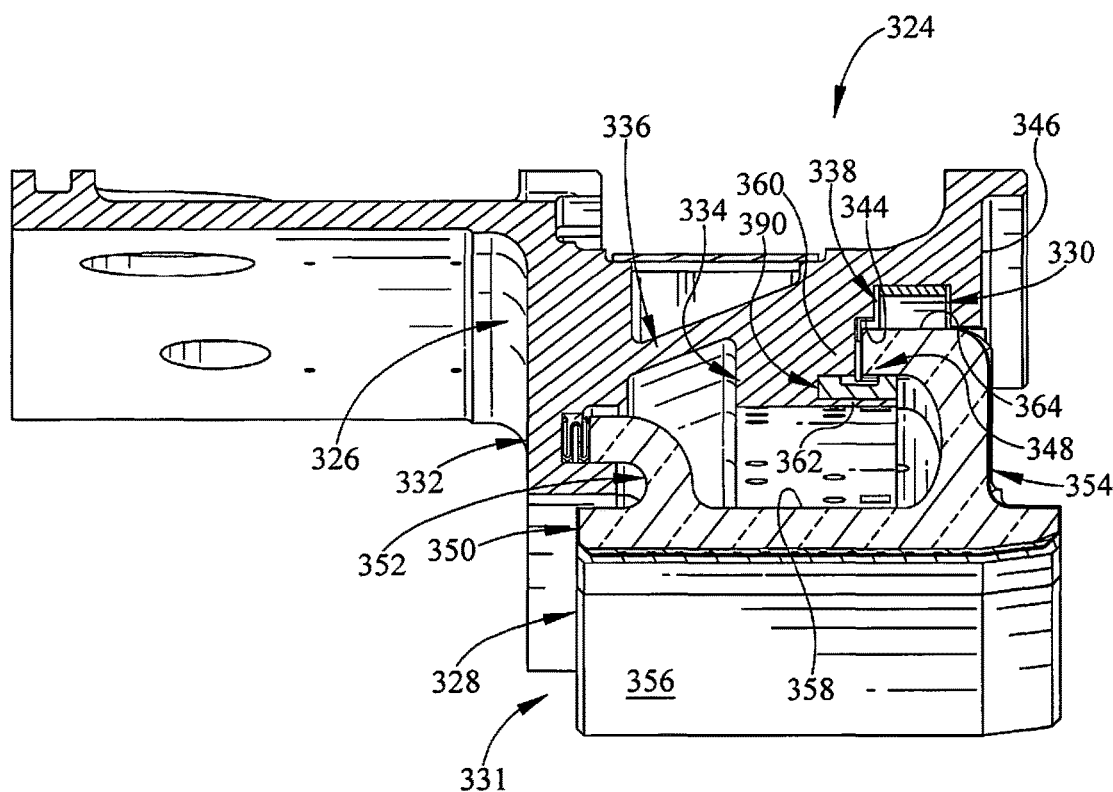
FIG. 7 is a cross sectional view of another embodiment of a turbine shroud adapted for use with the gas turbine engine of FIG. 1 showing that the retainers comprise leaf springs located in pockets formed in the carrier segment.
Figure 8:
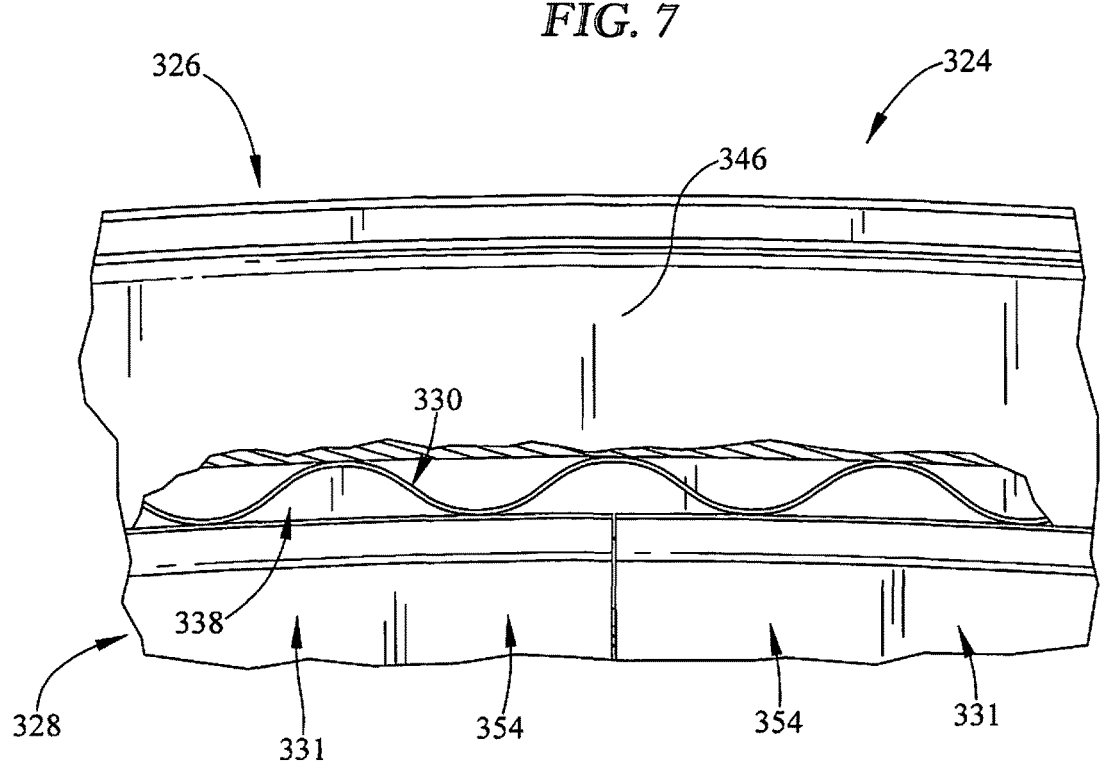
FIG. 8 is an elevation view of the aft side of the turbine shroud of FIG. 7 with portions broken away to show one of the leaf springs located in a pocket.

5 and 6. In some embodiments, the retainers 30 comprise leaf springs 330 as shown in FIGS. 7 and 8.

Turning back to the overall gas turbine engine 10 of FIG. 1, the engine 10 includes the fan 12, the compressor 14, the combustor 16, and the turbine 18. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 20 of the gas turbine engine 10 and drive the compressor 14 and the fan 12.

The turbine 18 includes the turbine wheel assembly 22 and the turbine shroud segment 24 as shown in FIG. 2. The illustrative turbine shroud segment 24 includes the carrier segment 26, the blade track 28, and the one or more retainers 30 as shown in FIG. 2.

The carrier segment 26 extends about the central axis 20 and is configured to support the blade track 28 around the blades 23 included in the turbine wheel assembly 22 as shown in FIG. 2. The illustrative carrier segment 26 comprises metallic materials. The carrier segment 26 includes a body plate 36, a forward bracket 32, and an aft bracket 34 axially spaced apart from the forward bracket 32. The body plate 36 is configured to couple the carrier segment 26 to an engine case included in the engine 10. The forward and aft brackets 32, 34 extend radially inward from the body plate 36 toward the central axis 20 and support forward and aft hangers 52, 54 included in the blade track 28 as shown in FIGS. 3 and 4.

The body plate 36 defines a plurality of pockets 38 that extend radially outward into the body plate 36 as shown in FIGS. 3 and 4. The pockets 38 are spaced apart from one another circumferentially and each pocket 38 receives one of the retainers 30. As shown in FIG. 3, two pockets 38 are circumferentially aligned and associated with each blade track segment 31. In other embodiments, more or less pockets 38 may be aligned and associated with each blade track segment 31.

The body plate 36 includes a radial inner surface 44 that faces the hanger 54 of the blade track 28 and an aft side surface 46 that extends radially away from the radial inner surface 44. As shown in FIG. 4, the pockets 38 extend radially outward into the radial inner surface 44 and axially forward through the aft side surface 46 into the body plate 36.

The aft bracket 34 defines a birdmouth 48 that receives the aft hanger 54 of the blade track 28 as shown in FIGS. 3 and 4. The aft bracket 34 includes a bracket body 60 and a bracket arm 62. The bracket body 60 extends radially inward toward the central axis 20 and the bracket arm 62 extends axially away from the bracket body 60 to define a portion of the birdmouth 48. The forward bracket 32 of the carrier segment 26 is substantially similar to the aft bracket 34.

The blade track 28 is generally concentric with and nests into the carrier segment 26 around the central axis 20 of the gas turbine engine 10 as suggested in FIGS. 2-4. The illustrative blade track 28 is formed from a plurality of blade track segments 31 which cooperate to form the hoop shaped blade track 28 and a plurality of rod seals 42 located between adjacent blade track segments 31 as suggested in FIG. 3. In other embodiments, rod seals 42 may be omitted and other sealing methods may be used such as, for example, strip seals.

Each blade track segment 31 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the blade track segments 31 may be made of other metallic, non-metallic, or composite materials with low coefficients of thermal expansion.

Each blade track segment 31 includes a runner 50, a forward hanger 52, and an aft hanger 54 as shown in FIGS. 3 and 4. The hangers 52, 54 (sometimes called attachment portions) interlock with the brackets 32, 34 of the carrier segment 26 to couple the blade track segment 31 to the carrier segment 26. The runner 50 is configured to block hot gasses from passing over the blades 23 as suggested in FIG. 2.

The aft hanger 54 includes an outer hanger surface 64 that face the radial inner surface 44 of the body plate 36. One or more clearance thicknesses may be measured between the outer hanger surface 64 of the aft hanger 54 and the radial inner surface 44 of the body plate to determine a size of the retainers 30.

The runner 50 includes a radial inner surface 56 and a radial outer surface 58 as shown in FIGS. 3 and 4. The radial inner surface 56 defines a portion of a primary flow path 88. The radial outer surface 58 is radially spaced apart from the radial inner surface 56 to locate the radial inner surface 56 between the central axis 20 and the radial outer surface 58. In some embodiments, the radial inner surface 56 and the radial outer surface 58 are non-linear and curved. Illustratively, the radial inner surface 56 and the radial outer surface 58 are arcuate.

The rod seals 42 are located between adjacent blade track segments 31 to block gasses from passing between the blade track segments 31. The rod seals 42 extend along a length of the blade track segments 31 in an axial direction. In other embodiments, adjacent blade track segments 31 are sealed with other suitable sealing methods such as, for example, by using strip seals.

In illustrative embodiments, each of the retainers 30 comprises a shim 30 received in a corresponding pocket 38 as shown in FIGS. 2-4. Illustratively, each shim 30 extends axially through the aft side surface 46 into the pocket 38. Each shim 30 extends radially outward out of the pocket 38 toward the aft hanger 54 of the blade track segment 31 to position the blade track segment 31 radially inward toward the central axis 20. Illustratively, each shim 30 is sized to block the blade track segment 31 from moving radially outward relative to the central axis 20.

The illustrative turbine shroud segment 24 further includes a plurality of load pads 90 as shown in FIG. 4. The load pads 90 are located radially between the aft hanger 54 of the blade track segment 31 and the bracket 34 of the carrier segment 26. The load pads 90 are located so that force loads acting on the hanger 54 are applied to the hanger 54 in predetermined locations. The plurality of load pads 90 are spaced apart circumferentially from one another. In illustrative embodiments, each retainer 30 is circumferentially aligned with one of the plurality of load pads 90.

A method of providing the turbine shroud segment 24 may include a number of steps. The method may include providing the carrier segment 26, the blade track segment 31, and the retainer 30. The hanger 54 of the blade track segment 31 is inserted into the birdmouth 48 of the carrier segment 26. The retainer 30 is positioned in the pocket 38 to block the blade track segment 31 from moving radially outward toward the body plate 36 of the carrier segment 26 relative to the central axis 20.

In some embodiments, the method further comprises determining a location of the radial inner surface 56 of the runner 50 included in the blade track segment 31 relative to the central axis 20 while the turbine shroud segment 24 is not in use. In some embodiments, the method further includes positioning a plurality of load pads 90 radially between the hanger 54 of the blade track segment 31 and the bracket 34 of the carrier segment 26.

In some embodiments, the method further comprises measuring a distance between the radial inner surface 44 of the body plate 36 and the outer hanger surface 64 of the hanger 54 to provide a clearance thickness measurement. In some embodiments, the method further comprises selecting a shim 30 based on the clearance thickness measurement.

Figure 5:
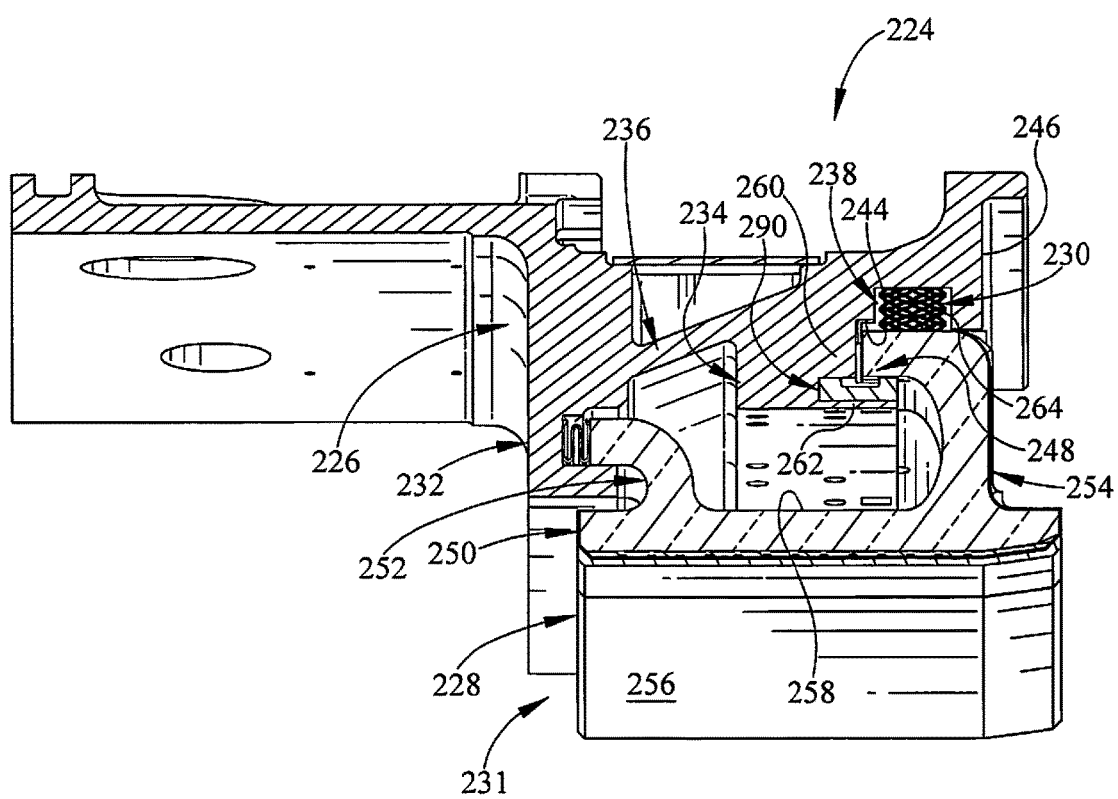
FIG. 5 is a cross sectional view of another embodiment of a turbine shroud adapted for use with the gas turbine engine of FIG. 1 showing that the retainers comprise cylindrical wave springs located in the pockets of the carrier segment.
Figure 6:
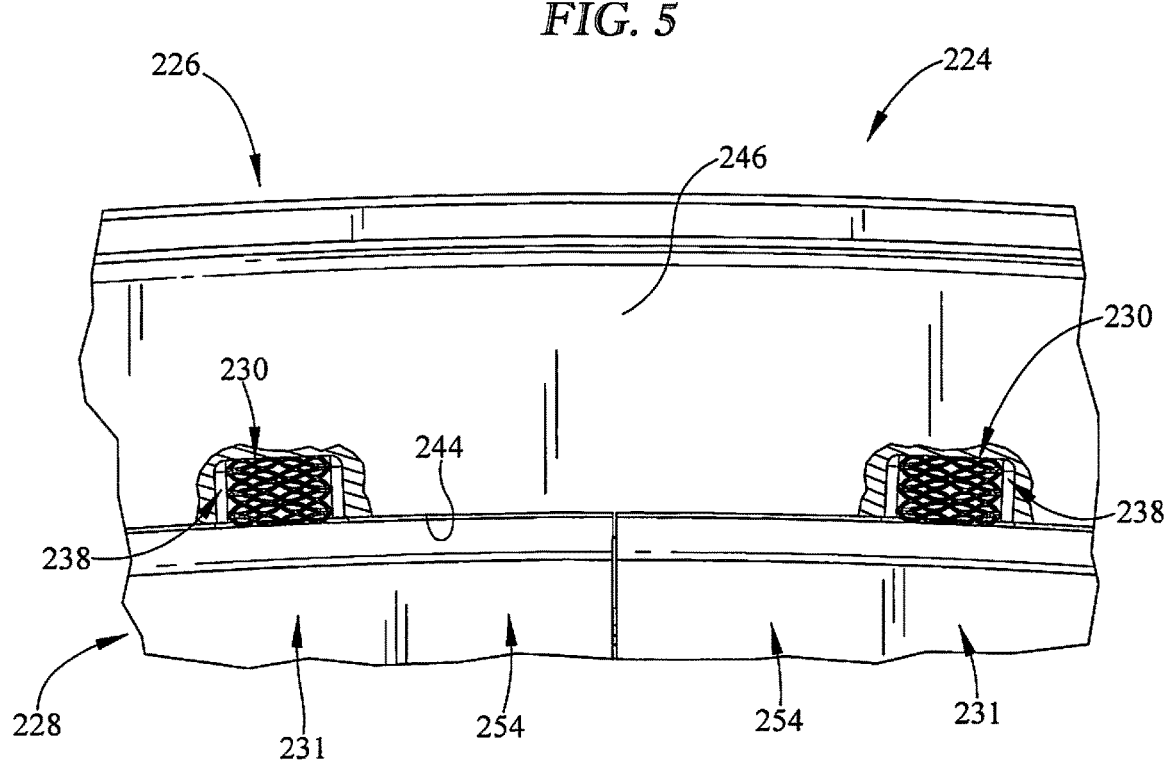
FIG. 6 is an elevation view of an aft side of the turbine shroud of FIG. 5 with portions broken away to show the cylindrical wave springs located in the pockets.

Another embodiment of a turbine shroud segment 224 for use in a gas turbine engine assembly 10 is shown in FIGS. 5 and 6. The turbine shroud segment 224 is substantially similar to the turbine shroud segment 24 shown in FIGS. 1-4 and described herein. Accordingly, similar reference numbers in the 200 series indicate features that are common between the turbine shroud segment 24 and the turbine shroud segment 224. The description of the turbine shroud segment 24 is incorporated by reference to apply to the turbine shroud segment 224, except in instances when it conflicts with the specific description and the drawings of the turbine shroud segment 224.

The turbine shroud segment 224 includes a carrier segment 226, a blade track segment 231, and a plurality of retainers 230 as shown in FIGS. 5 and 6. Each of the retainers 230 comprises a cylindrical wave spring 230 received in a corresponding pocket 238 of the carrier segment 226.

Each cylindrical wave spring 230 extends radially outward out of the pocket 238 toward the aft hanger 254 of the blade track segment 231 to position the blade track segment 231 radially inward toward the central axis 20. As shown in FIG. 5, the aft side surface 246 of the body plate 236 extends radially inward to close the pockets 238 at their aft ends and to block axial movement of the cylindrical wave springs 230 out of the pockets 238. In other embodiments, the aft side surface 246 of the body plate 236 does not extend over and close the pockets 238 at their aft ends. In such embodiments, a retainer ring may be used to close the pockets 238 and block axial movement of the cylindrical wave springs 230 out of the pockets 238.

Another embodiment of a turbine shroud segment 324 for use in a gas turbine engine assembly 10 is shown in FIGS. 7 and 8. The turbine shroud segment 324 is substantially similar to the turbine shroud segment 24 shown in FIGS. 1-4 and described herein. Accordingly, similar reference numbers in the 300 series indicate features that are common between the turbine shroud segment 24 and the turbine shroud segment 324. The description of the turbine shroud segment 24 is incorporated by reference to apply to the turbine shroud segment 324, except in instances when it conflicts with the specific description and the drawings of the turbine shroud segment 324.

The turbine shroud segment 324 includes a carrier segment 326, a blade track segment 331, and one or more retainers 330 as shown in FIGS. 7 and 8. Each of the retainers 330 comprises a leaf spring 330 received in a corresponding pocket 338 of the carrier segment 326. Each leaf spring 330 includes undulations that extend radially outward out of the pocket 338 toward the aft hanger 354 of the blade track segment 331 to position the blade track segment 331 radially inward toward the central axis 20.

As shown in FIG. 7, the aft side surface 346 of the body plate 336 extends radially inward to close the pockets 338 at their aft ends and to block axial movement of the leaf springs 330 out of the pockets 338. In other embodiments, the aft side surface 346 of the body plate 336 does not extend over and close the pockets 338 at their aft ends. In such embodiments, a retainer ring may be used to close the pockets 338 and block axial movement of the leaf spring 330 out of the pockets 338.

Typical gas turbine engine may include alternating stages of static vanes and rotating blades in the compressor and turbine. The rotating blades may impart mechanical energy to the flowpath gases in the compressor and they may extract mechanical energy from the flowpath gases in the turbine. In both the compressor and turbine, the blades may be fitted to a rotating disc or drum.

For designs where a shroud is not integral to the blade, the tips of the blades may move past static blade tracks (also called seal segments or shrouds) which may be positioned radially outboard of the rotating blades. The size of the clearance between the blade tips and the blade track segments may impact the aerodynamic efficiency. Without a seal segment radially outboard of the blade, air may be free to migrate over the blade tip from the pressure side of the blade to the suction side.

During engine operation, a positive pressure differential may be established between the cavity radially outboard of the blade track segment and the primary gas path radially inboard of the blade track segment. Each blade track segment hanger may load radially inward onto its corresponding bracket which may control the radial position of the blade track segment gaspath surface. The fit of the blade track segment hangers into the "birdmouth" gaps in the brackets may be a controlled clearance fit.

For applications which use a blade track segment or carrier made of a material other than metal such as, for example, a ceramic matrix composite (CMC), it may not be possible or practical to tightly control the blade track segment and bracket features with precision machining. In such a scenario, a tight clearance fit may not be established between the segment hangers and the carrier "birdmouth" gaps due to a lack of precise dimensional control of those features. If the segment and carrier are made of materials with significantly different coefficients of thermal expansion, a tight gap may not be possible if physical arch-binding (and resulting stresses) between the carrier and segment hangers due to thermal expansion differences is unacceptable.

Such may be the case with a CMC seal segment which may not tolerate these binding stresses. In any of these instances, a fit between the segment and brackets may be relatively large. A loose fit between a blade track segment and a bracket may have an impact on blade tip clearance in the absence of a sufficient pressure differential loading the segment radially inboard onto the face of the bracket.

Such a scenario may occur at a low power setting during operation or while the engine is not being operated, such as during assembly or overhaul. It may be desirable for the segments to be loaded radially inboard at their representative radial positions during assembly and overhaul if the gas path position is measured at cold build. This may be of interest for a test engine where the tip clearance at cold build may be recorded so that its effects can be quantified as part of the engine test. Segments which are circumferentially located away from the top of the engine could be impacted the most (due to gravity). In order to mitigate this risk to minimizing tip clearance, several features may positively position a blade track segment radially onto brackets. In one embodiment, one or more of several types of springs provide a retention force. In other embodiments, a series of gap-filling shims are used.

In illustrative embodiments, a series of cylindrical wave springs provide a retention force at the rear hanger of the blade track segment. The springs are retained by a pocket machined into the carrier above the rear hanger. A spring of appropriate stiffness and working height may be chosen.

Springs may not generally be used in the high pressure turbine section of the engine due to creep and stress relaxation in the springs while they are compressed at high temperatures. However, in the illustrative application, the spring could relax to a state of zero stress when the engine is at a hot condition and the segment would be radially loaded onto the brackets due to the pressure load. In this state, the spring is at its most extended state possible after assembly into the engine. If the spring relaxes to a state of zero stress at this condition, any further compression of the spring (due to the segment falling away from the bracket) would result in it still providing a reactive force to the segment, loading it toward the bracket as desired to maintain the proper radial location of the segment. In some embodiments, two springs are located at the rear hanger of each blade track segment. In other embodiments, more or less springs could be used at either or both of the front and aft hangers of each blade track segment.

Another embodiment uses springs similar to a leaf spring made from strips of sheet metal to provide the radial retention force for the segment. The number of undulations in the spring may vary. In some embodiments, more than one point of contact is provided on the blade track segment hanger. The spring could be fit into a machined pocket in the carrier or into the gap between the blade track segment and brackets.

In some embodiments, a series of gap-filling shims are used. In order to accommodate variation in the gap between the carrier and blade track segment hangers, a variety of shim thicknesses could be available for assembly. In some embodiments, the thickest shim size which can easily fit in each gap is used. In some embodiments, the shims are retained by pockets which are machined into the carrier. In some embodiments, some gap may be present between the carrier, shim, and blade track segment assembly. The gap would be minimized compared to the original gap between the carrier and blade track segment hangers. In some embodiments, two shims are used per segment. In other embodiments, more or less shims may be used and they may be used at either or both of the forward and aft hangers.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
a carrier segment comprising metallic materials, the carrier segment including a body plate that extends partway around a central axis of the gas turbine engine and a bracket that extends radially inward away from the body plate, the body plate defines a first pocket that extends radially outward into the body plate, and the bracket defines an axially opening channel located radially inward of the first pocket, a blade track segment comprising ceramic matrix composite materials, the blade track segment including a runner shaped to extend partway around the central axis to define a primary gas path and a hanger that extends radially outward from the runner and into the channel of the carrier segment, the hanger being sized relative to the channel such that a gap is provided between a radially outer surface of the hanger and a radially inner surface of the carrier segment defining the first pocket to allow for different thermal expansion rates between the carrier segment and the blade track segment to avoid binding stresses, and a first spring located in the first pocket and configured to positively position the blade track segment radially inward toward the central axis so that the hanger engages the bracket, the first spring sized to extend radially inward out of the first pocket into the channel and into engagement with the blade track segment in order to apply a retention force to the hanger of the blade track segment in order to position the blade track segment so that a clearance distance between the runner and turbine blades located in the primary gas path can be measured while the turbine shroud segment is not in operation, wherein the body plate includes a radial inner surface that faces the hanger and an aft side surface that extends radially away from the radial inner surface and the first pocket extends axially through the aft side surface into the body plate.

2. The turbine shroud segment of claim 1, further comprising a plurality of load pads located radially between the hanger and the bracket to locate force loads acting on the hanger, the plurality of load pads are spaced apart circumferentially from one another, and the first spring is circumferentially aligned with one of the plurality of load pads.

3. The turbine shroud segment of claim 2, wherein the body plate of the carrier segment defines a second pocket that extends radially outward into the body plate, the second pocket is spaced apart circumferentially from the first pocket, and the turbine shroud segment further comprises a second spring positioned in the second pocket.

4. The turbine shroud segment of claim 1, wherein the first spring comprises a cylindrical wave spring.

5. The turbine shroud segment of claim 1, wherein the first spring comprises a leaf spring that extends circumferentially and includes undulations that extend radially inward and radially outward relative to the central axis.

6. A turbine shroud segment comprising
a metallic carrier segment including a body plate spaced apart from a central axis of a gas turbine engine and a bracket that extends away from the body plate to define a channel and the body plate defines a pocket that opens into the channel, a ceramic matrix composite blade track segment including a runner shaped to extend partway around the central axis and an attachment portion that extends into the channel to define a gap between the attachment portion and the body plate to allow for different thermal expansion rates between the carrier segment and the blade track segment and to avoid binding stresses, and a retainer positioned in the pocket and configured to positively position the blade track segment radially inward toward the central axis so that the hanger engages the bracket, the retainer sized to extend radially inward out of the pocket to block the blade track segment from moving radially outward relative to the central axis, wherein the body plate includes a radial inner surface that faces the hanger and an aft side surface that extends radially away from the radial inner surface and the first pocket extends axially through the aft side surface into the body plate.

7. The turbine shroud segment of claim 6, further comprising a plurality of load pads positioned radially between the attachment portion of the blade track segment and the bracket.

8. The turbine shroud segment of claim 6, further comprising a load pad positioned radially between the attachment portion of the blade track segment and the bracket and the retainer is circumferentially aligned with the load pad.

9. The turbine shroud segment of claim 8, wherein the retainer comprises a cylindrical wave spring.

10. The turbine shroud segment of claim 6, wherein the retainer comprises a leaf spring that extends circumferentially and undulates radially inward and radially outward relative to the central axis.

11. A method of providing turbine shroud segment adapted for use with a gas turbine engine, the method comprising
providing a metallic carrier segment shaped to extend partway around a central axis of the gas turbine engine, a ceramic matrix composite blade track segment, and a spring, the carrier segment including a body plate formed to include a pocket that extends radially outward into the body plate and a bracket that extends radially inward from the body plate to define an axially opening channel between the body plate and the bracket, and the blade track segment including a runner that extends partway around the central axis and a hanger that extends radially outward from the runner, wherein the body plate includes a radial inner surface that faces the hanger and an aft side surface that extends radially away from the radial inner surface and the first pocket extends axially through the aft side surface into the body plate,
inserting the hanger of the blade track segment into the channel of the carrier segment,
sizing the hanger relative to the channel so that a gap is provided radially between the hanger and the bracket to avoid binding between the blade track segment and the carrier segment as the blade track segment and the carrier segment grow at different rates during operation of the gas turbine engine,
positioning the spring in the pocket to block the blade track segment from moving radially outward toward the body plate relative to the central axis when the gas turbine engine is not being operated,
biasing the hanger into engagement with the bracket with the spring to close the gap at cold build, and
measuring a distance between a radial inner surface of the body plate and an outer hanger surface of the hanger at cold build to provide a clearance thickness measurement, and
maintaining the hanger in contact with the bracket as the gap closes during operation of the gas turbine engine due to the different rates of thermal expansion between the carrier segment and the blade track segment when the gas turbine engine is in operation.

12. The method of claim 11, wherein the runner has a radial inner surface that faces the central axis and a radial outer surface spaced apart from the radial inner surface and the method further comprises determining a location of the radial inner surface relative to the central axis while the turbine shroud segment is not in use.

13. The method of claim 12, further comprising positioning a plurality of load pads radially between the hanger of the blade track segment and the bracket of the carrier segment.

14. The method of claim 11, wherein the step of providing includes providing a plurality of metallic carrier segments and a plurality of ceramic matrix composite blade track segments and sizing the plurality of ceramic matrix composite blade track segments so that they are loosely fitted with the carrier segments at cold build to avoid binding stresses that occur as a result of the different rates of thermal expansion between the carrier segments and the blade track segments.

* * * * *